(12) United States Patent
Sugisono et al.

(10) Patent No.: US 9,215,163 B2
(45) Date of Patent: Dec. 15, 2015

(54) PATH CALCULATING METHOD, PROGRAM AND CALCULATING APPARATUS

(75) Inventors: Koji Sugisono, Tokyo (JP); Michihiro Aoki, Tokyo (JP); Hideaki Iwata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 660 days.

(21) Appl. No.: 13/129,178

(22) PCT Filed: Nov. 18, 2009

(86) PCT No.: PCT/JP2009/069573
§ 371 (c)(1),
(2), (4) Date: May 13, 2011

(87) PCT Pub. No.: WO2010/058797
PCT Pub. Date: May 27, 2010

(65) Prior Publication Data
US 2011/0222437 A1    Sep. 15, 2011

(30) Foreign Application Priority Data

Nov. 19, 2008 (JP) ................................. 2008-295458
Nov. 21, 2008 (JP) ................................. 2008-297983

(51) Int. Cl.
*H04L 12/721* (2013.01)
*H04L 12/751* (2013.01)
(Continued)

(52) U.S. Cl.
CPC ................ *H04L 45/12* (2013.01); *H04L 45/02* (2013.01); *H04L 45/028* (2013.01); *H04L 45/123* (2013.01); *H04L 45/48* (2013.01)

(58) Field of Classification Search
None
See application file for complete search history.

(56) References Cited

U.S. PATENT DOCUMENTS 4,987,536 A * 1/1991 Humblet ....................... 709/241
5,321,815 A    6/1994 Bartolanzo, Jr. et al.
(Continued)

FOREIGN PATENT DOCUMENTS

CN    1849776 A    10/2006
JP    2004-023473 A    1/2004
(Continued)

OTHER PUBLICATIONS

Qing Zhu et al., "A Source-Based Algorithm for Delay-Constrained Minimum-Cost Multicasting", Infocom '95. Fourteenth Annual Joint Conference of the IEEE Computer and Communications Societies. Bringing Information to People Proceedings. IEEE, vol. 1, IEEE, 1995.04, pp. 377 to 385.

(Continued)

*Primary Examiner* — Hicham Foud
(74) *Attorney, Agent, or Firm* — Carrier Blackman & Associates, P.C.; Joseph P. Carrier; Jeffrey T. Gedeon

(57) ABSTRACT

A calculating apparatus calculates a shortest path connecting two nodes of a network. A shortest-path group, which is a set of shortest paths having node Y as their starting points, can be calculated at once by having calculated a shortest path having node Y as its starting point for each of other nodes. When the shortest-path group having node Y as the starting point is calculated and further if a group of shortest paths having node X as their starting points is stored beforehand in a storing unit, then path portions, which belong to the group of shortest paths having node X as the starting points and further which are paths extending from node Y to the nodes located downstream from node Y, are utilized as part of a result of calculation of the shortest path group having node Y as the starting point.

15 Claims, 11 Drawing Sheets

(51) Int. Cl.
*H04L 12/759* (2013.01)
*H04L 12/753* (2013.01)

(56) References Cited

U.S. PATENT DOCUMENTS

| | | | |
|---|---|---|---|
| 5,561,790 A * | 10/1996 | Fusaro | 703/26 |
| 6,098,107 A * | 8/2000 | Narvaez-Guarnieri et al. | 709/239 |
| 6,646,989 B1 | 11/2003 | Khotimsky et al. | |
| 6,704,320 B1 * | 3/2004 | Narvaez et al. | 370/408 |
| 7,219,159 B2 * | 5/2007 | Mouri et al. | 709/241 |
| 7,280,481 B2 * | 10/2007 | Rong | 370/238 |
| 2003/0231599 A1 | 12/2003 | Umezawa | |
| 2005/0073958 A1 | 4/2005 | Atlas et al. | |
| 2005/0078610 A1 | 4/2005 | Previdi et al. | |
| 2005/0078656 A1 | 4/2005 | Bryant et al. | |
| 2009/0046587 A1 * | 2/2009 | Kothari et al. | 370/238 |
| 2009/0185491 A1 * | 7/2009 | Schollmeier et al. | 370/238 |
| 2012/0033552 A1 * | 2/2012 | Dasylva et al. | 370/230 |

FOREIGN PATENT DOCUMENTS

| | | |
|---|---|---|
| JP | 2005-159846 A | 6/2005 |
| JP | 2005-333238 A | 12/2005 |

OTHER PUBLICATIONS

Dijkstra, E. W., "A Note on Two Problems in Connexion With Graphs", Numerische Mathematik 1, (1959), pp. 269-271.

Xiao et al., "Dynamic Update of Shortest Path Tree in OSPF", Proceedings of the 7th International Symposium on Parallel Architectures, Algorithms, and Networks (ISPAN'04), 1087-4089/04, copyright 2004 IEEE.

* cited by examiner

PATH CALCULATING METHOD, PROGRAM AND CALCULATING APPARATUS

CROSS REFERENCE TO RELATED APPLICATIONS

The present application is US National Phase Application of International Application PCT/JP2009/069573, filed on Nov. 18, 2009, which claims priority to Japanese patent applications Nos. 2008-295458, filed on Nov. 19, 2008, and 2008-297983, filed on Nov. 21, 2008. The entire subject matter of these priority documents, including specification claims and drawings thereof, is incorporated by reference herein.

FIELD OF THE INVENTION

The present invention relates to a path calculating method, program and calculating apparatus.

BACKGROUND OF THE INVENTION

There are cases where a change is brought about in how links connecting nodes are arranged in a network (topology). The change sometimes causes that a point or an area in the network can be passed which has not been possible before, and vice versa.

If a path from any starting point to any destination point is required to be the shortest, along with a change in a topology of the path, it is necessary to calculate the shortest path after the topological change.

In a method of calculating the shortest path according to the related art, if a topology changes, all shortest paths connecting two nodes are calculated again using information on the topology after the change.

Such a shortest path calculating method is described in non-Patent Document 1. Note that the method described in non-Patent Document 1 is known as the Dijkstra's algorithm.

Of note is the fact that, in many cases, there is no difference between the shortest paths before and after the topological change. In another cases, if the shortest path connecting nodes other than nodes to be calculated has already been calculated after the topological change, there is no difference between the already-calculated shortest path and the shortest path between the nodes to be calculated.

In a method of calculating the shortest path according to the related art, the shortest path is calculated using information only on how links connecting nodes are arranged. The method according to the related art fails to use information on already-existing shortest paths, even if there is no difference between the shortest paths before and after the topological change. This disadvantageously requires all shortest paths to be recalculated, which takes a longer calculating time.

In a method of calculating the shortest path, a numerical value called a cost is generally assigned to a link connecting two nodes. The shortest path is obtained by calculating an appropriate path such that a sum of costs of links through which the path goes is minimal.

Non-Patent Document 2 discloses a technique of, if the cost of a given link is changed, calculating the shortest path after its topological change, using information on the shortest path before the topological change. The technique can solve the problem that it takes a longer calculating time to recalculate all the shortest paths as described above.

[Non-Patent Document 1] E. W. Dijkstra: A note on two problems in connexion with graphs. In Numerische Mathematik, 1(1959), S. 269-271.

[Non-Patent Document 2] B. Xiao, et al. "Dynamic update of shortest path tree in OSPF," IEEE Parallel Architectures Algorithms and Network, pp. 18-23, May 2004.

DISCLOSURE OF INVENTION

Problems to be Solved by the Invention

In the meantime, non-Patent Document 2 is directed to only such a topological change that a cost of a link present in a topology is changed.

However, the topological change also includes a case in which: a link connecting nodes is newly added; a link and a node are simultaneously added; and a link is deleted.

Non-Patent Document 2 does not take topological changes including addition of a link which is not present before the topological change or deletion of a link, as a trigger for a start of calculation, and thus performs no recalculation of the shortest path.

Therefore, addition of appropriate procedures is necessary if addition or deletion of a link brings about a topological change and the shortest path is calculated.

The present invention has been made in an attempt to provide a path calculating method, a program and a calculating apparatus capable of recalculating the shortest path even if a link is newly added or deleted.

Means for Solving the Problems

The present invention is characterized in that, if a shortest path having one node as a starting point has already been calculated and a shortest path having another node as a starting point is to be calculated, the calculation is performed making use of the already-calculated shortest path having the one node as the starting point. More specifically, the present invention has the following characteristics.

A calculating apparatus of the present invention calculates the shortest path connecting two nodes in a network and includes:

a storage unit that stores therein information including a group of the shortest paths between the nodes;

a control unit that calculates a shortest path group which is a set of shortest paths having a node Y as a starting point at once, by calculating the shortest path having the node Y as the starting point for each of other nodes, and calculates the shortest path group using information which includes a piece of information on a node located upstream of each node and multiple pieces of information on nodes located downstream of each node and represents paths between given nodes in a tree structure by tracing a relation of which node is located upstream or downstream of which node, and performs a first processing in which, in calculating the shortest path group having the node Y as the starting point, if the storage unit stores therein a shortest path group having a node X as a starting point, from the shortest path group having the node X as the starting point, the control unit takes a path from the node Y to a node located downstream of the node Y as the shortest path, that is, a calculation result and also as a part of an intermediate calculation result of the shortest path group having the node Y as the starting point.

The control unit performs a second processing in which the control unit searches for a node "a" from nodes not going through any portion of the intermediate calculation result of the shortest path group having the node Y as the starting point, the node "a" being reachable by a link in one hop from a node passing through a portion of the intermediate calculation result, and, from paths from the node Y to the node a, the control unit takes a path R1 which goes through both the link in one hop and a path going through the intermediate calculation result from the node Y to a node going through a portion of the intermediate calculation result out of extreme points of the link, as a candidate shortest path from the node Y to the node a, and performs a third processing in which, if the candidate shortest path from the node Y to the node a is present, the control unit selects a candidate shortest path having the shortest distance as R2, compares a distance of the selected shortest path R2 to an other path having been already found by the time of the selection of the shortest path R2 as a path from the node Y to the node a, and, if the selected shortest path R2 is determined to be the shortest, takes the selected shortest path R2 as the shortest path from the node Y to the node a and also as a portion of an intermediate calculation result of the shortest path group having the node Y as the starting point.

If a candidate shortest path having the node Y as the starting point and connecting any other node is present in the third processing, the control unit selects a candidate shortest path having the shortest distance as R2, compares a distance of the selected shortest path R2 to other path having been already found by the time of the selection of the shortest path R2 as a path from the node Y to the node a, and, if the selected shortest path R2 is determined to be the shortest, takes the selected shortest path R2 as the shortest path from the node Y to the node a and also as a portion of an intermediate calculation result of the shortest path group having the node Y as the starting point.

The control unit performs a fourth processing in which the control unit changes a distance from the node Y to a node located downstream of the node a, to a distance which goes through both the selected shortest path from the node Y to the node a and a path reached in accordance with a path tree from the node a to the node located downstream of the node a, and takes the path tree located downstream of the node a as a portion of an intermediate calculation result of the shortest path group having the node Y as the starting point.

The control unit: performs a fifth processing in which the control unit searches for a node a' which is reachable by a link in one hop from a node located downstream of the node a; finds, as a path from the node Y to the node a', a path R3 which reaches the node a' from the node Y in accordance with a path tree, and a path R4 which goes through the link in one hop, the selected shortest path from the node Y to the node a, and a path from the node a to an extreme point of the link in one hop; and, if a distance of the path R4 is shorter, takes the path R4 as a candidate shortest path from the node Y to the node a', and, back to the third processing, the control unit determines the shortest path from the node Y to the node a'.

A path calculating method of the present invention is a method in a network in which a plurality of nodes are connected by links, in which a computer calculates the shortest path which is the shortest communication path between two nodes of the plurality of nodes.

The computer includes: a control unit; and a storage unit that stores therein information including the shortest path between the nodes.

The control unit performs
a comparison step of comparing a distance of a first communication path between, from among the plurality of nodes, a starting node as a starting point of a communication path and an adjacent node located adjacent to the starting node, to a distance of a second communication path which has already been calculated other than the first communication path and has already been stored in the storage unit, a step of, if the distance of the first communication path is shorter than the second communication path, taking the first communication path as a candidate of the shortest path, a step of, if the distance of the first communication path is not shorter than the second communication path, taking the second communication path as a candidate of the shortest path, and the comparison step taking the adjacent node as a next starting node.

In the path calculating method, the control unit performs:
a step of comparing a distance of a path via a shortest path tree made up of the candidate shortest paths to an end node of the two nodes to a distance of a path via a path tree other than the shortest path tree to the end node of the two nodes; and a step of, according to a result of the comparison, taking whichever is shorter between the distance of the path via the shortest path tree made up of the candidate shortest paths to the end node of the two nodes or the distance of the path via the path tree other than the shortest path tree to the end node of the two nodes, as the shortest path to the end node of the two nodes.

In the path calculating method, the control unit performs a step of, if the distance of the first communication path is smaller than a recorded value recorded in the end node, updating the recorded value to the distance of the first communication path.

In the path calculating method, the control unit performs a step of, if the distance via the shortest path tree to the end node of the two nodes is shorter than the distance of the path via the path tree other than the shortest path tree to the end node of the two nodes, updating a recorded value recorded in the end node, to a distance of the path via the shortest path tree.

A program of the present invention is a program which, in a network in which a plurality of nodes are connected by links, calculates the shortest path which is the shortest communication path between two nodes of the plurality of nodes.

The program causes a computer to perform
a comparison procedure of comparing a distance of a first communication path between, from among the plurality of nodes, a starting node as a starting point of a communication path and an adjacent node located adjacent to the starting node, to a distance of a second communication path which has already been calculated other than the first communication path and has already been stored in the storage unit, a procedure of, if the distance of the first communication path is shorter than the second communication path, taking the first communication path as a candidate of the shortest path, a procedure of, if the distance of the first communication path is not shorter than the second communication path, taking the second communication path as a candidate of the shortest path, and the comparison procedure taking the adjacent node as a next starting node.

The program causes a computer to further perform:
a step of comparing a distance of a path via a shortest path tree made up of the candidate shortest paths to an end node of the two nodes to a distance of a path via a path tree other than the shortest path tree to the end node of the two nodes; and a step of, according to a result of the comparison, taking whichever is shorter between the distance of the path via the shortest path tree made up of the candidate shortest paths to the end node of the two nodes or the distance of the path via the path tree other than the shortest path tree to the end node of the two nodes, as the shortest path to the end node of the two nodes.

A calculating apparatus of the present invention is a calculating apparatus, in a network in which a plurality of nodes are connected by links, which calculates the shortest path which is the shortest communication path between two nodes of the plurality of nodes and includes:

a storage unit that stores therein information including the shortest path between the nodes; and a control unit that: compares a distance of a first communication path between, from among the plurality of nodes, a starting node as a starting point of a communication path and an adjacent node located adjacent to the starting node, to a distance of a second communication path which has already been calculated other than the first communication path and has already been stored in the storage unit; if the distance of the first communication path is shorter than the second communication path, takes the first communication path as a candidate of the shortest path; if the distance of the first communication path is not shorter than the second communication path, takes the second communication path as a candidate of the shortest path; and takes the adjacent node as a next starting node and compares a distance of the first communication path to a distance of the second communication path.

In the calculating apparatus, the control unit: compares a distance of a path via a shortest path tree made up of the candidate shortest paths to an end node of the two nodes to a distance of a path via a path tree other than the shortest path tree to the end node of the two nodes; and, according to a result of the comparison, takes whichever is shorter between the distance of the path via the shortest path tree made up of the candidate shortest paths to the end node of the two nodes or the distance of the path via the path tree other than the shortest path tree to the end node of the two nodes, as the shortest path to the end node of the two nodes.

In the calculating apparatus, if the distance of the first communication path is smaller than a recorded value recorded in the end node, the control unit updates the recorded value to the distance of the first communication path.

In the calculating apparatus, if the distance via the shortest path tree to the end node of the two nodes is shorter than the distance of the path via the path tree other than the shortest path tree to the end node of the two nodes, the control unit updates a recorded value recorded in the end node, to a distance of the path via the shortest path tree.

Advantageous Effects of the Invention

In the present invention, even if a topology is changed owing to addition or deletion of a link, the shortest path can be calculated. Further, similarly to the method disclosed in non-Patent Document 2, the shortest path is calculated using path information on a shortest path which has already been calculated so far. This can reduce a calculating time of the shortest path, compared to the method disclosed in non-Patent Document 1.

REFERENCE NUMERALS

Figure 1:
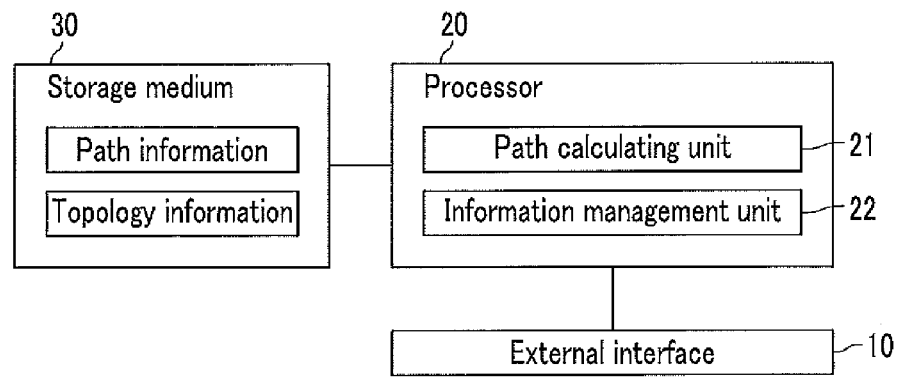
FIG. 1 is a block diagram illustrating a configuration of a shortest path calculating apparatus according to a first embodiment of the present invention.

10 external interface
20 processor
21 path calculating unit
22 information management unit
30 storage medium
100 calculating apparatus
101 external interface unit
102 control unit
103 storage unit
200-1 to 200-8 nodes

BEST MODE FOR CARRYING OUT THE INVENTION

First Embodiment

Below is described a first embodiment for carrying out the present invention with reference to related drawings.

<1> Configuration of Shortest Path Calculating Apparatus

Next is described a configuration of a shortest path calculating apparatus according to this embodiment with reference to FIG. 1.

Referring to FIG. 1, the shortest path calculating apparatus according to this embodiment includes an external interface 10, a processor 20, and a storage medium 30.

The external interface 10 transmits a calculation result to other devices and receives topology information on topology from other devices.

The processor 20 includes: a path calculating unit 21 that calculates the shortest path between two nodes in a network; and an information management unit 22 that updates or obtains path information on the shortest path calculated by the path calculating unit 21 or topology information on topology received from other devices.

The storage medium 30 stores therein the path information and the topology information.

<2> Shortest Path Calculating Method

Next is described a shortest path calculating method in which the shortest path between two nodes in a network is calculated in the shortest path calculating apparatus shown in FIG. 1. In the calculating method, a plurality of shortest paths having the same node as respective starting nodes are calculated at one time, when shortest paths connecting any two of all nodes are calculated.

<2-1> Definition of Terms

Terms used in describing the first embodiment are defined as follows. Note that the definition of the terms is also applied to a second embodiment.

—Shortest Path Tree

A shortest path tree is a shortest path group which is a set of shortest paths having the same node as respective starting points, from among the shortest paths connecting any two of all nodes in a network.

Paths included in a set may be partially the same as others. It is redundant to keep individual information on such paths having portions same as others. Thus, in this embodiment, a tree structure is used for representing a set of paths.

Specifically, a path is represented by information on each node and on an adjacent node thereto along the path. More specifically, the information includes a piece of information on a node located upstream of the each node and multiple pieces of information on a node located downstream of the each node. A path between given two nodes is represented in a tree structure by tracing a relation of which node is located upstream or downstream of which node in the information. Let the shortest path connecting two given nodes be represented by a segment connecting the two nodes in the tree.

Figure 2A:
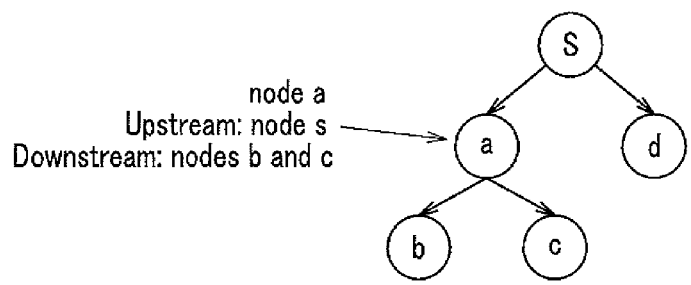
FIG. 2A is a diagram for explaining the terms "shortest path tree" according to first and second embodiments.

In FIG. 2A, for example, the shortest paths between nodes s and a, nodes s and b, nodes s and c, and nodes s and d have the same starting point, which is the node s. A set of these shortest paths forms a shortest path tree having the node s as the starting point.

—Candidate Path

A candidate path is a path connecting two nodes which possibly becomes a part of a shortest path calculation result. In finally determining the shortest path, procedures to be described hereinafter are performed. According to the procedures, a candidate path having the shortest distance is sequentially determined as the shortest path which is also a part of the shortest path calculation result.

—Parent Node

A parent node of a node n is a node adjacent to the node n (that is, reaches the node n in one hop) in a path and is located upstream along the path.

In FIG. 2A, for example, the parent node of the node a is the node s.

—Subordinate Tree

A subordinate tree of the node n is a path tree which forms a part of the shortest path to be calculated and is a path tree connecting the node n to a node located downstream of the node n. Note that the node n itself is included in the subordinate tree.

Figure 2B:
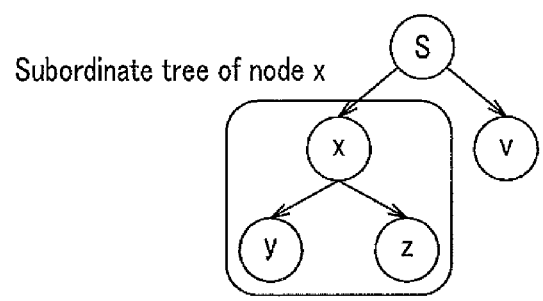
FIG. 2B is a diagram for explaining the terms "subordinate tree" according to the first and second embodiments.

In FIG. 2B, for example, a subordinate tree of a node x is a path tree which connects the node x to a node y and to a node z.

—Distance

A distance is not an actual distance or the number of hops between nodes but a prescribed weight in connecting between the nodes.

<2-2> Calculation Procedure

Figure 3:
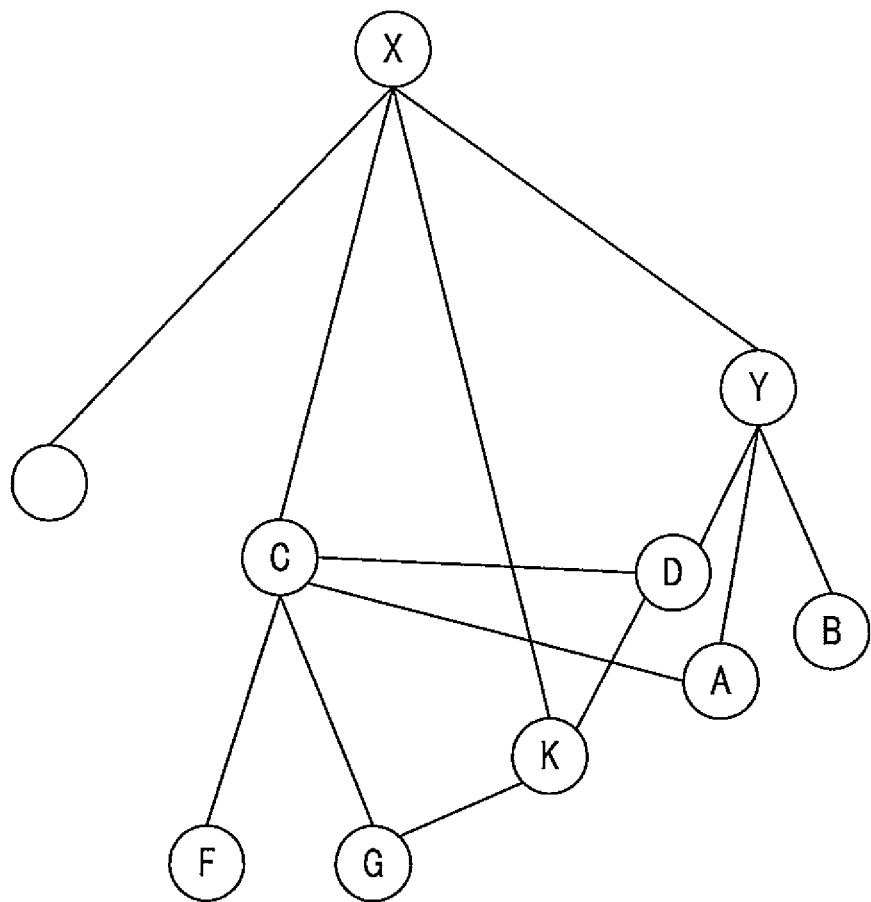
FIG. 3 is a diagram illustrating an example of a connection relation of nodes in a network.
Figure 4:
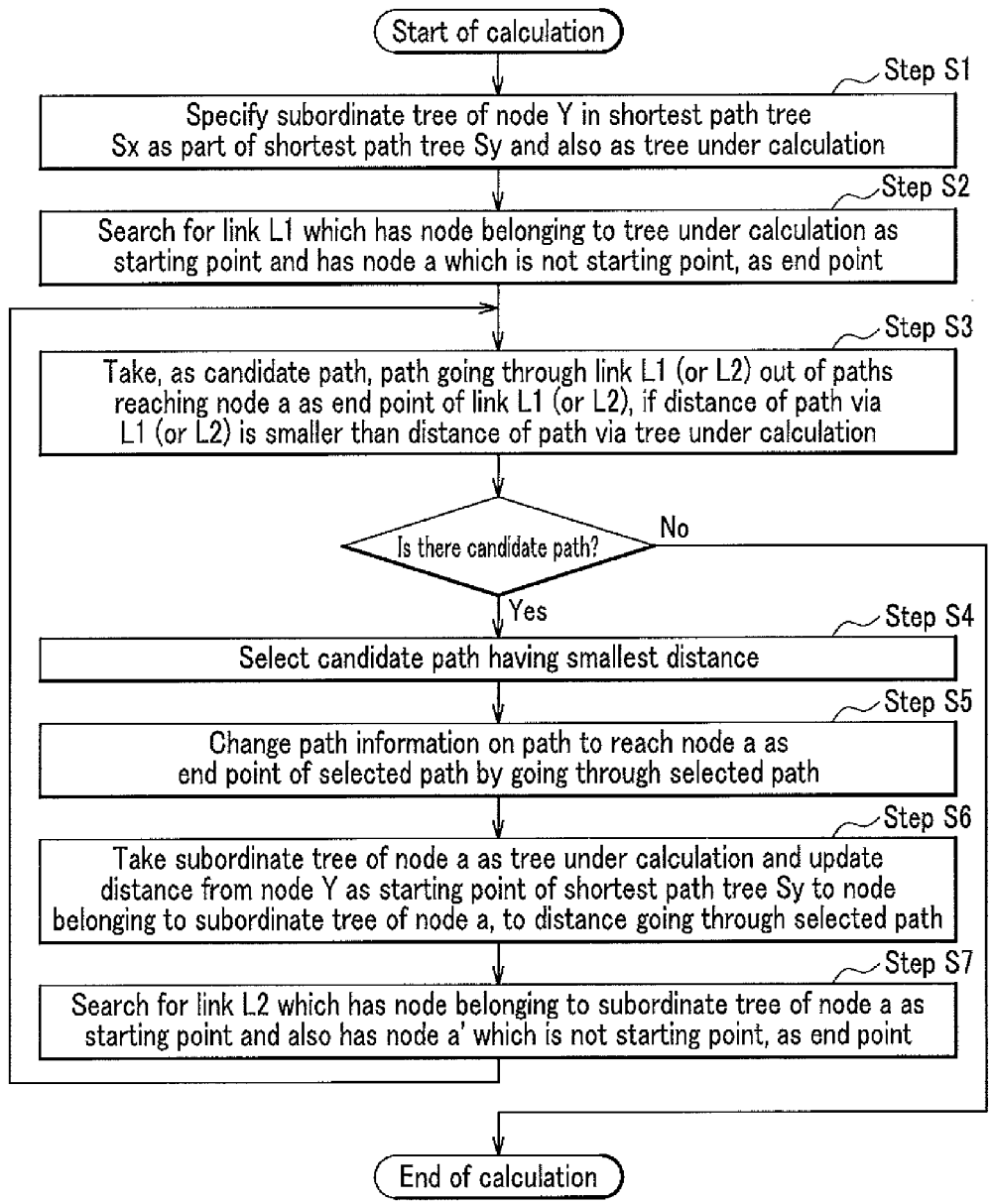
FIG. 4 is a flowchart illustrating an example of a shortest path calculating method according to the first embodiment.

Next are described procedures for calculating the shortest path between two nodes in a network with reference to FIG. 4, assuming that a connection relation of nodes in the network is as shown in FIG. 3 after a topological change.

Herein, a shortest path tree Sy is calculated which is a set of shortest paths each of which has a node Y as a starting point. A parent node of the node Y is a node X. It is also assumed that a shortest path tree Sx is already present which has the node X as a starting point and has already been calculated after the topological change.

In step S1, the path calculating unit 21 searches for the node Y from the shortest path tree Sx and specifies a part downstream of the node Y of the shortest path tree Sx, as a subordinate tree of the node Y. The path calculating unit 21 takes the subordinate tree of the node Y as a part of a calculation result of the shortest path tree Sy and also as a tree under calculation.

Then, the path calculating unit 21 sequentially determines the shortest path which starts from the node Y and reaches a node not belonging to a tree under calculation.

In step S2, the path calculating unit 21 searches for a link L1 which: has a node belonging to the tree under calculation as a starting point; and has a node, that is herein represented as a node "a", which is reachable in one hop and does not belong to the tree under calculation, as the endpoint. The path calculating unit 21 finds, for example, a path R1 as a path from the node Y to the node a. The path R1 goes through both the link L1 and a tree passing through a node which is the other extreme point of the link L1 from the tree under calculation.

In step S3, the path calculating unit 21 takes the path R1 as a candidate path, if any other path from the node Y to the node a is not found. If any other path from the node Y to the node a is found and if a distance of the path R1 is smaller than a distance of the found shortest path, the path calculating unit 21 takes the path R1 as a candidate path.

Note that the following steps are repeated until no more candidate path is found.

In step S4, the path calculating unit 21 selects a candidate path having the smallest distance if candidate paths are present. In finding a path from the node Y to the node a as the end point, the path calculating unit 21 compares a distance of the selected candidate path with a distance of any other candidate path having already been found before the selected candidate path is selected. If the distance of the selected candidate path is the smallest, the selected candidate path is taken as the shortest path R2 from the node Y to the node a as the end point, in other words, a part of a calculation result of the shortest path tree Sy.

In step S5, the information management unit 22 updates path information on a path to the node a in the shortest path tree Sy, to information on the selected path R2.

In step S6, if a subordinate tree of the node a is present, both the subordinate tree of the node Y and the subordinate tree of the node a are taken as trees under calculation. The information management unit 22 updates a distance from the node Y to a node belonging to the subordinate tree of the node a, to a distance of the path selected in step S4 plus a path going through the subordinate tree of the node a.

The above-described update changes the distance from the node Y to the node a as well as the distance from the node Y to the node belonging to the subordinate tree of the node a. Thus, with respect to some nodes, a distance of a path passing through the node belonging to the subordinate tree of the node a is smaller than a distance of a path having already been found. In order to find such a shorter path, step S7 is performed as follows.

In step S7, the path calculating unit 21 searches for a link L2 which has a node belonging to the subordinate tree of the node a as a starting point and also has a node, that is herein represented by a node "a'", which is reachable in one hop and does not belong to the subordinate tree of the node a, as an end point. If, from among paths from the node Y to an extreme point of the link L2, a distance of a path R4 going through the subordinate tree of the node a and the link L2 is shorter than a path R3 going through only the subordinate tree, the path calculating unit 21 takes the path R4 as a candidate path to the node a'. After that, the processing returns to steps S3 to S4 for finally determining the shortest path from the node Y to the node a'.

<2-3> Specific Example of Calculation Procedures

A specific example of the aforementioned calculation procedures is described with reference to FIG. 5 to FIG. 8.

Figure 5:
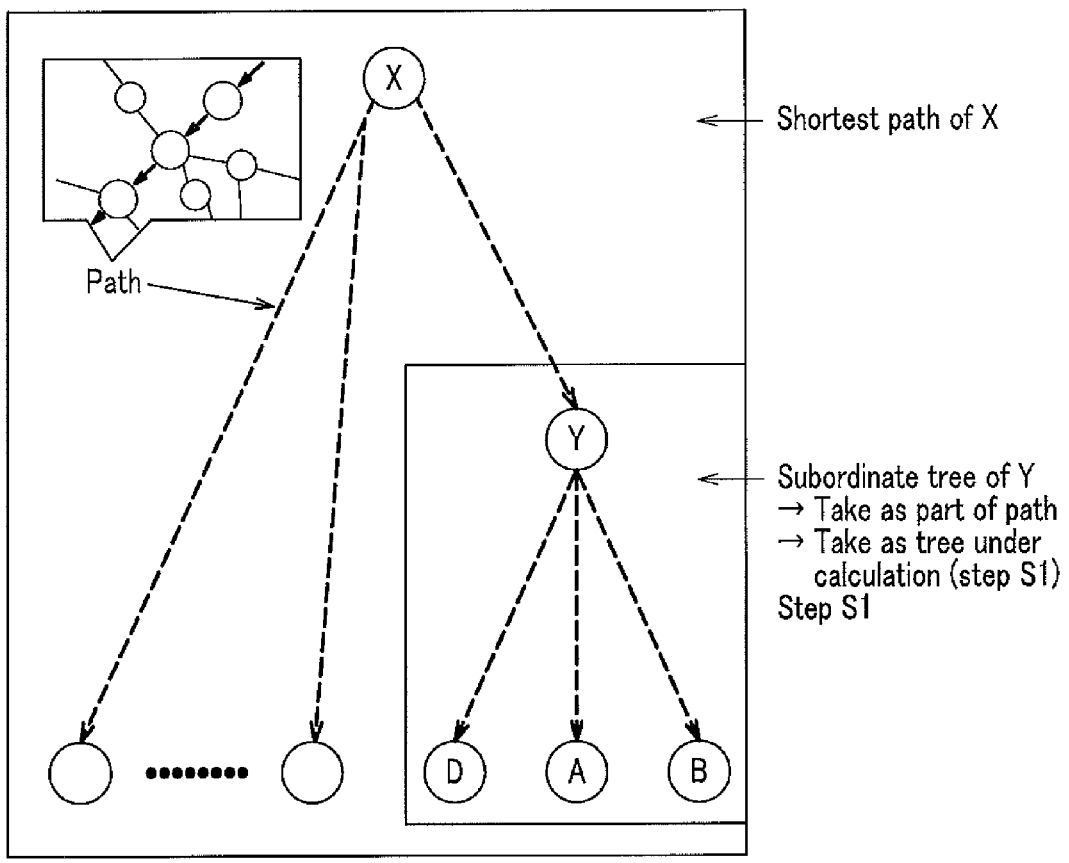
FIG. 5 is a diagram for explaining step S1 shown in FIG. 4.

Next is described step S1 with reference to FIG. 5.

The shortest path tree Sx which has the node X as the starting point and has been calculated after the topological change is shown in directional dashed lines. Herein, the shortest path tree Sy is to be calculated which is a set of shortest paths each having the node Y as the starting point.

In step S1, the path calculating unit 21 searches the shortest path tree Sx for the node Y and for a subordinate tree of the node Y. The path calculating unit 21 then takes the subordinate tree of the node Y as a part of a calculation result of the shortest path tree Sy and also as a tree under calculation.

Figure 6:
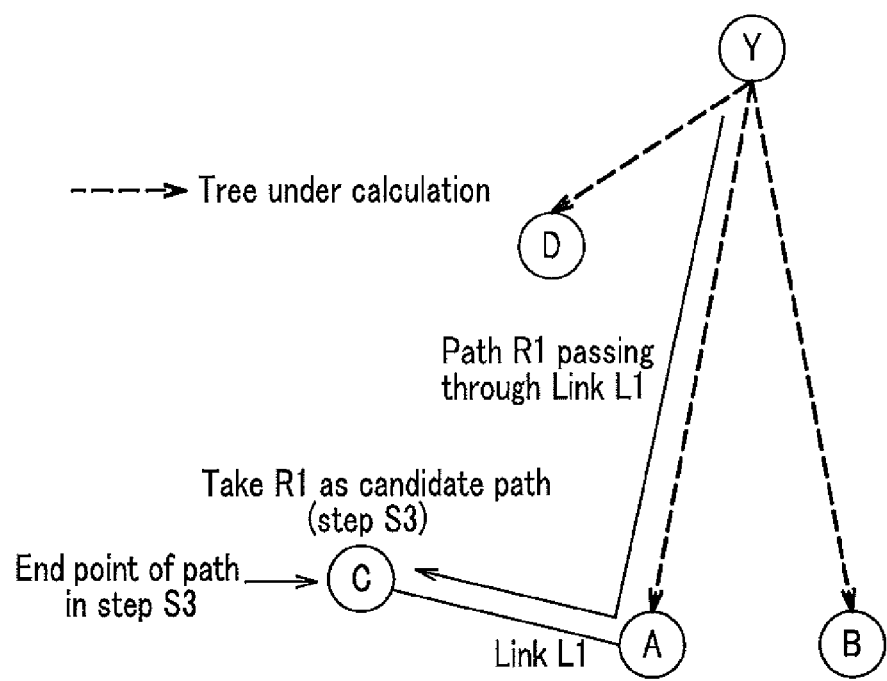
FIG. 6 is a diagram for explaining steps S2 and S3 shown in FIG. 4.

Next are described steps S2 and S3 with reference to FIG. 6.

In step S2, it is assumed that the path calculating unit 21 first searches for the node C as a node which is reachable in one hop from the node A belonging to the tree under calculation. The path calculating unit 21 then finds, as a path from the node Y to the node C, a route R1 (Y→A→C) which goes through the tree under calculation (Y→A) and the link L1 connecting the node A to the node C.

At this stage, no other path to the node C has been found. Thus, in step S3, the path calculating unit 21 takes the path (Y→A→C) R1 as a candidate path.

Figure 7:
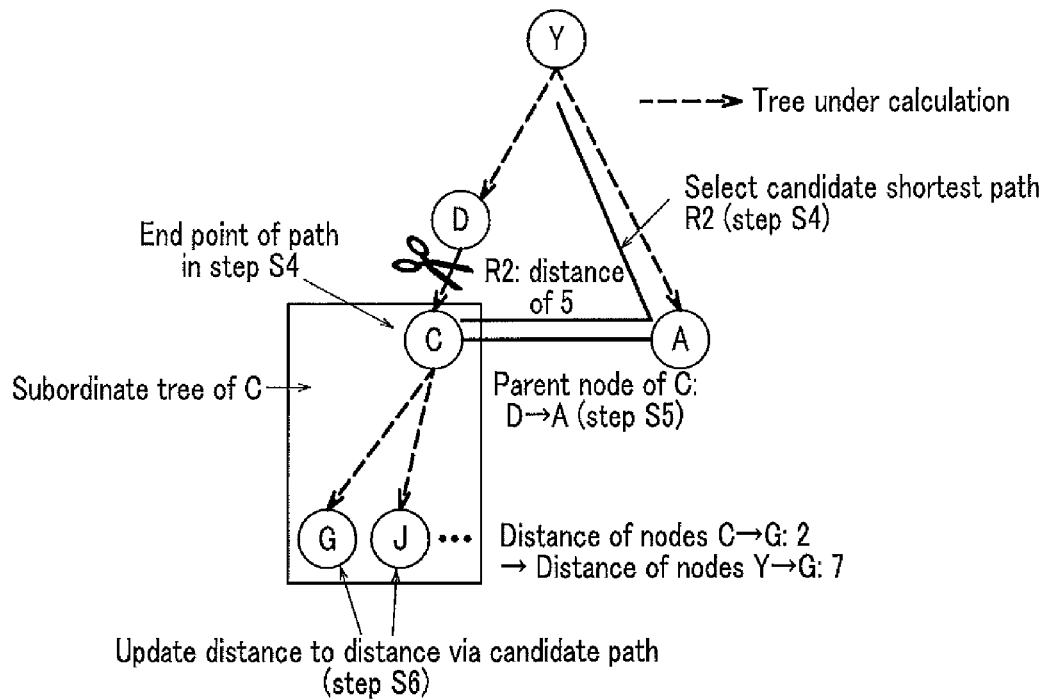
FIG. 7 is a diagram for explaining steps S4 to S6 shown in FIG. 4.

Next are described steps S4 to S6 with reference to FIG. 7.

It is assumed herein that a path (Y→A→C) which passes through the node A belonging to the tree under calculation is newly taken as a candidate path to the node C, after a path (Y→D→C) which passes through the node D belonging to the tree under calculation has already been taken as the candidate path.

In step S4, if a distance (cost) of the path (Y→A→C) as the new candidate path is smaller than that of the path (Y→D→C) as the older candidate path, the path calculating unit 21 takes the path (Y→A→C) as the shortest path R2 from the node Y to the node C. For example, if the distance of the path (Y→A→C) is "5" and that of the path (Y→D→C) is "6" or more, the path calculating unit 21 determines the path (Y→A→C) as the shortest path R2.

In step S5, the information management unit 22 updates information on the shortest path from the node Y to the node C as the end point of the path, to information on the path (Y→A→C). An example of the update is that, if a connection relation between nodes in a tree is represented by a node of interest and a parent node thereof, that is, a one-hop upstream node thereof, the parent node is changed to a node one-hop upstream along the selected path. In this case, the parent node of the node C as the end point of the path is changed from the node D to the node A which is a parent node along the path (Y→A→C) R2.

In step S6, if any node is present in a subordinate tree of the node C which is the end point of the path, the subordinate tree of the node Y and the subordinate tree of the node C are taken as the trees under calculation. The information management unit 22 updates a distance from the node Y to a subordinate tree of the node C, to a distance of a path reached by going through the path (Y→A→C) R2 and the subordinate tree of the node C. If information on the subordinate tree of the node C is present, a distance to each node belonging to the subordinate tree of the node C can be easily calculated using the information on the subordinate tree of the node C. For example, suppose that a distance from the node C to a node G belonging to the subordinate tree of the node C is "2". Also suppose that the distance of the path (Y→A→C) R2 is "5". The information management unit 22 then calculates a distance of a path going through the path (Y→A→C) R2 and the subordinate tree of the node C to obtain the result of "7". The value of the distance is taken as a value of the distance from the node Y to the node G.

Figure 8:
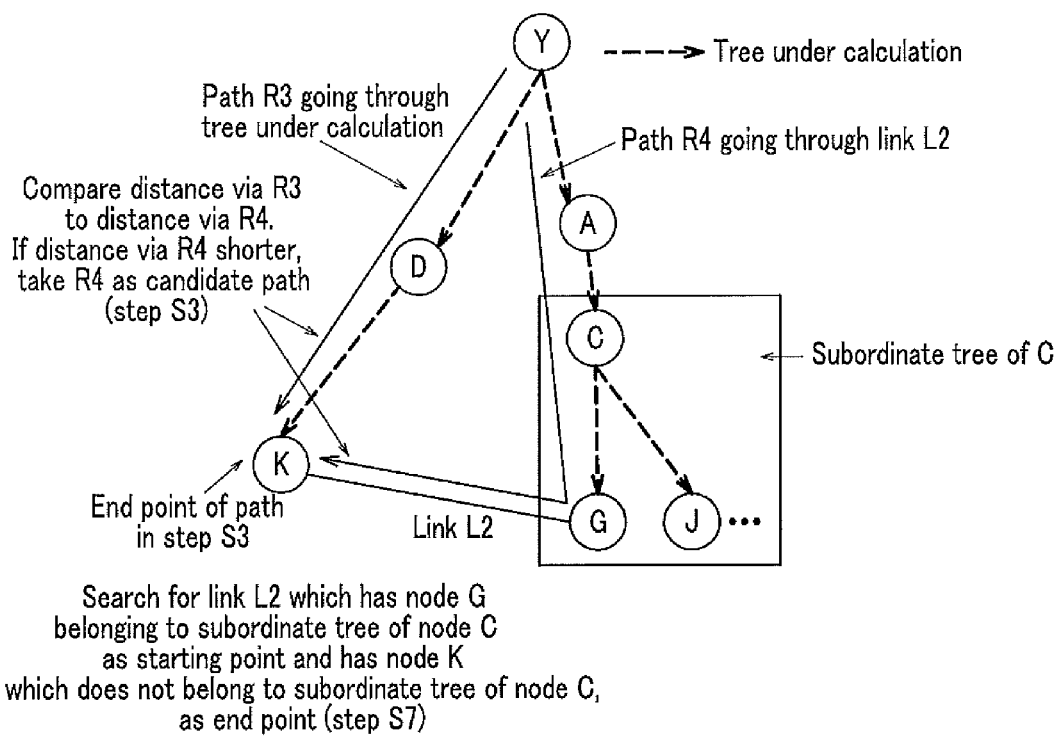
FIG. 8 is a diagram for explaining steps S7 and S3 shown in FIG. 4.

Next are described steps S7 and S3 with reference to FIG. 8.

In step S7, it is searched if there is any case where, in a path from the node Y to a node not belonging to the subordinate tree of the node C in the previous step, a distance of a path going through the subordinate tree of the node C is shorter. More specifically, the path calculating unit 21 searches for a node which does not belong to the subordinate tree of the node C and for the link L2 which has a node belonging to the subordinate tree of the node C as a starting point and has the node not belonging to the subordinate tree of the node C as an end point. It is assumed herein that the path calculating unit 21 finds the node K as a result of the search. It is also assumed that, as a result of the search in step S2, the node K has already been found as the node reachable in one hop from the node D which belongs to the subordinate tree of the node Y, and a path (Y→D→K) R3 has already been found as a path going through the subordinate tree of the node Y, that is, the tree under calculation.

Thus, in step S3, the path calculating unit 21 finds, as a path from the node Y to the node K which is the end point of the link L2, the path (Y→D→K) R3 going through the tree under calculation, and the path (Y→A→C→G→K) R4 going through the tree under calculation and the subordinate tree of the node C. Of the two paths, if a distance of the (Y→A→C→G→K) R4 is shorter, the path calculating unit 21 takes the path (Y→A→C→G→K) R4 as a candidate path.

The steps described above are repeated until no more candidate paths are found.

Note that the shortest path calculating method of the present invention is applicable to a computer program to be executed by a computer. The program can be stored in a storage medium or can be provided to the outside via a network.

Advantageous Effects of First Embodiment

In this embodiment, the shortest path can be calculated even if a topology changes after a link is newly added or deleted, which cannot be done by the method disclosed in non-Patent Document 2. This is because, if a shortest path group has already been calculated in which each shortest path has a node other than a node of interest as a starting point after the topology changes, this embodiment makes use of a result of the calculation. Further, in this embodiment, the shortest path can be calculated even if a link is newly added, because a path going through the newly added link is also searched and a new path therethrough can be found.

In other words, even if a topology changes after a link is newly added or deleted, the shortest path can be calculated, which is advantageous. Further, in this embodiment, the shortest path is calculated using the path information which has already been calculated, similarly to the method of non-Patent Document 2. This makes it possible to reduce a time of calculating the shortest path, compared to the method of non-Patent Document 1, which is advantageous.

Second Embodiment

Next is described a second embodiment of the present invention with reference to related drawings.

Figure 9:
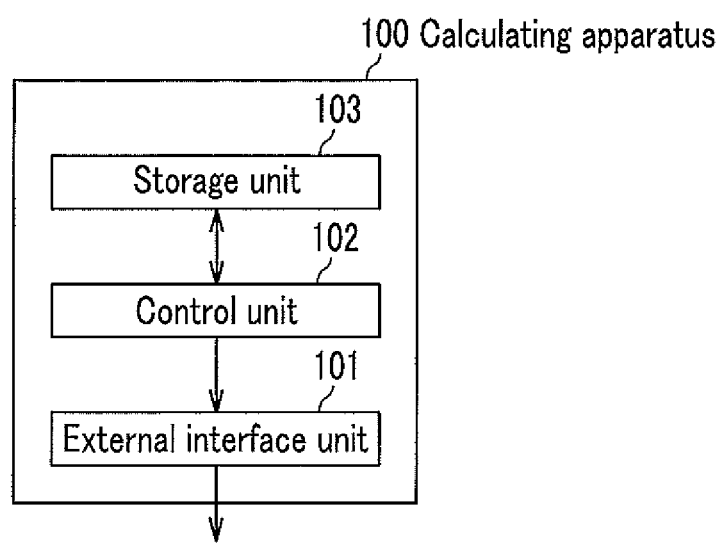
FIG. 9 is a diagram illustrating a configuration of a calculating apparatus according to the second embodiment of the present invention.

FIG. 9 is a diagram illustrating a calculating apparatus according to the second embodiment of the present invention.

As shown in FIG. 9, a calculating apparatus 100 in this embodiment includes an external interface unit 101, a control unit 102, and a storage unit 103.

The external interface unit 101 transmits results calculated by the calculating apparatus 100, to other device connected to the calculating apparatus 100 under instruction from the control unit 102. The external interface unit 101 also receives information on a topology of a network which is transmitted from other device connected to the calculating apparatus 100 and outputs the received information to the control unit 102.

The control unit 102 has a path calculating function of calculating a communication path (which may be simply referred to as a path hereinafter) between nodes, connected to the network. The control unit 102 also has an information management function of updating and obtaining path information on a calculated path or information on a topology. The control unit 102 exchanges the information with other device via the external interface unit 101.

The storage unit 103 stores therein the path information calculated by the control unit 102 or the information obtained from other device via the external interface 101 (such as topology information or the like). The storage unit 103 also stores therein a program executed by the control unit 102.

Figure 10:
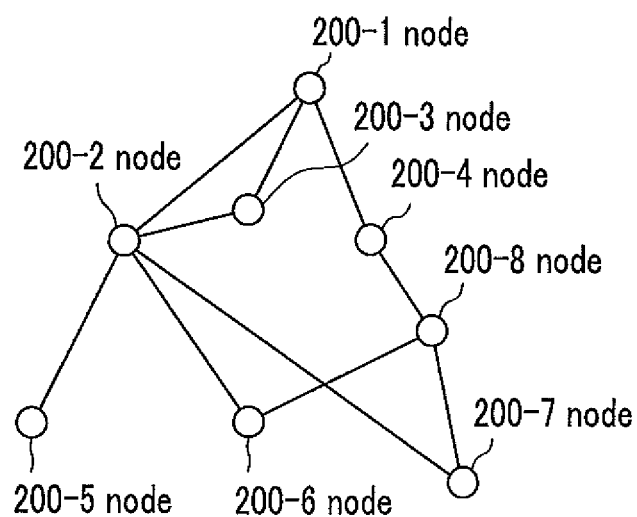
FIG. 10 is a diagram illustrating an example of a topology in which the calculating apparatus shown in FIG. 9 calculates a path.

FIG. 10 is a diagram illustrating an example of a topology of which path the calculating apparatus 100 shown in FIG. 9 calculates.

In FIG. 10, nodes 200-1 to 200-8 are connected one another as an example of the topology of which path the calculating apparatus 100 shown in FIG. 9 calculates.

The calculating apparatus 100 is disposed in a position where path information on the nodes 200-1 to 200-8 can be obtained.

The calculating apparatus 100 is used for calculating the shortest path between two nodes in the topology as shown in FIG. 10. In calculating shortest paths between two nodes in a network, the calculating method in this embodiment makes it possible to calculate a plurality of shortest paths having the same node as respective starting points at one time. Note that the terms defined for describing the first embodiment are also applied to description of the second embodiment.

Next is described a path calculating method in the calculating apparatus 100 shown in FIG. 9.

Figure 11:
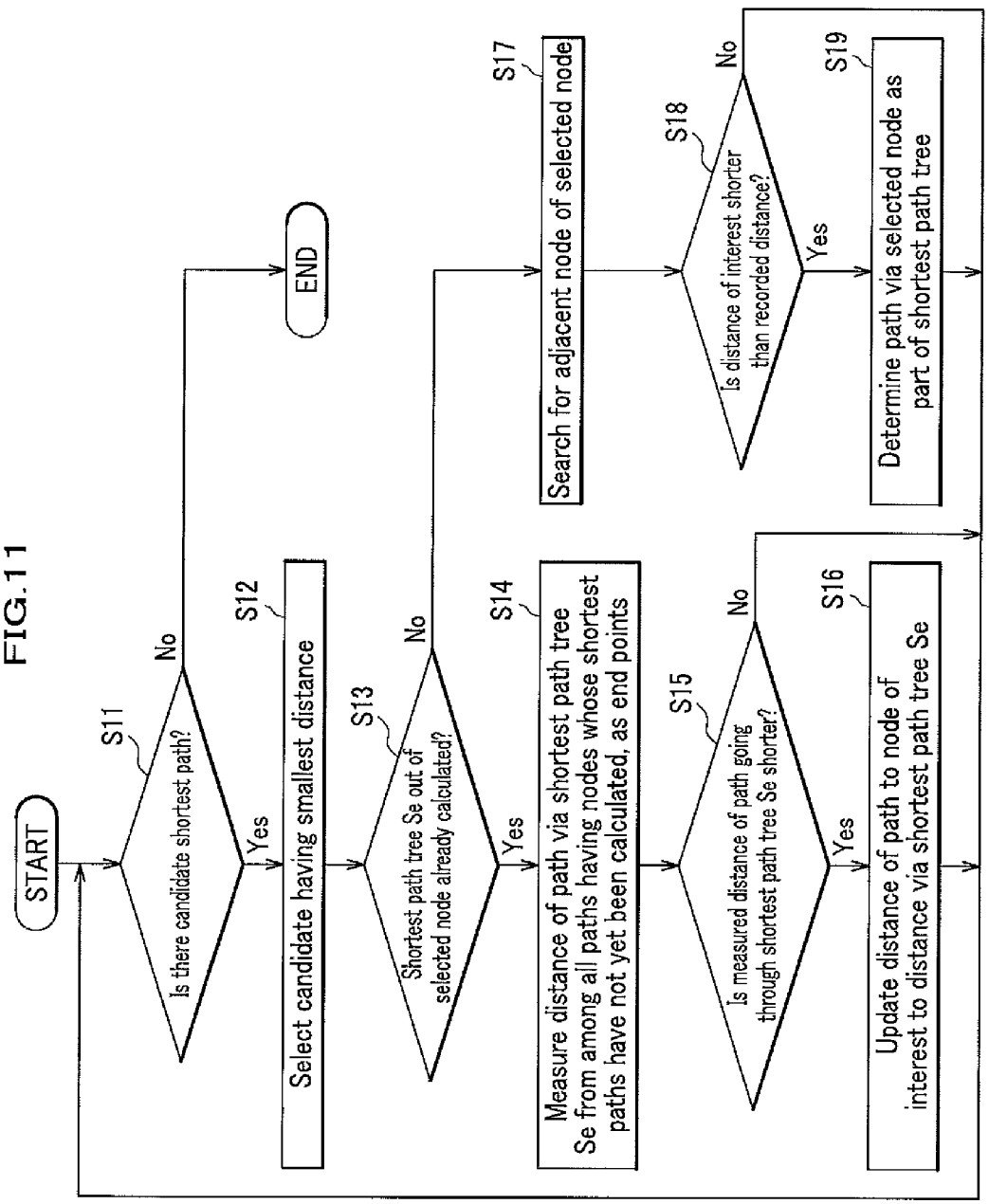
FIG. 11 is a flowchart for explaining a path calculating method in the calculating apparatus shown in FIG. 9.

FIG. 11 is a flowchart illustrating a path calculating method in the calculating apparatus 100 shown in FIG. 9. Herein, a shortest path tree Sx which is a set of shortest paths having a node x (the node 200-1 of FIG. 10) as respective starting points (starting nodes). It is assumed that the shortest path tree Sy is present which has already been calculated after a topology is changed. Note that "y" represents not a specific node but any node of which shortest path tree having the node itself as a starting point has already been calculated.

First, a node adjacent to the node x, that is, a node directly connected to the node x with a link is searched for. If there is one such node adjacent to the node x, the one node is selected. If there are a plurality of such nodes adjacent to the node x, a plurality of the nodes are selected.

Then, a path from the node x to the each adjacent node is taken as a candidate shortest path. Assume that a distance from the node x to a node other than the each adjacent node is indefinite. It is determined whether or not there is such a candidate shortest path (step S11).

Figure 12:
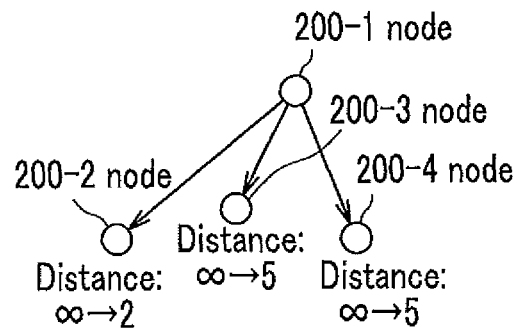
FIG. 12 is a schematic diagram illustrating step S11 of FIG. 11.

FIG. 12 is a schematic diagram of procedures in step S11 of FIG. 11.

As shown in FIG. 12, if a node 200-1 has three adjacent nodes, nodes 200-2 to 200-4, paths from the node 200-1 to each of the nodes 200-2 to 200-4 are selected as candidate shortest paths.

Subsequent procedures are repeated until a candidate shortest path is not found any more.

From among the selected plural nodes (the nodes 200-2 to 200-4), a node having the shortest distance from the node x (the node 200-1) is further selected (step S12). Respective nodes have records of distances of the shortest paths which have been found until that time. An initial value of the distance is infinity. If a new shortest path has been found, the distance is changed to a tentative distance (a tentative shortest distance). FIG. 12 exemplifies that a distance from the node 200-1 to the node 200-2 is "2". A distance from the node 200-1 to the node 200-3 is "5". A distance from the node 200-1 to the node 200-4 is also "5". Therefore, the node 200-2 having the shortest distance from the node 200-1 is selected, and a path from the node 200-1 to the node 200-2 is taken as a candidate shortest path.

Figure 13:
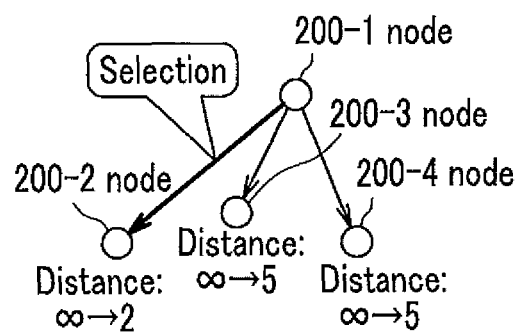
FIG. 13 is a schematic diagram illustrating procedures of selecting a node 200-2 as a portion of the shortest path from a node 200-1.

FIG. 13 is a schematic diagram illustrating procedures of selecting the node 200-2 as a portion of the shortest path from the node 200-1.

As shown in FIG. 13, the node 200-2 having the shortest distance from the node 200-1 is selected.

Herein, if the distance of the path from the node 200-1 to the node 200-2 is the shortest of the distances of all paths having already been found at the time of the selection, the path is taken as the shortest path (a candidate path) to the node 200-2, that is, as a calculation result.

It is then determined whether or not the shortest path (a shortest path tree Se) which has an end node of the selected candidate (in this case, the node 200-2) as a starting point has already been calculated (step S13). The determination is made by determining whether or not the storage unit 103 stores therein the shortest path tree Se. Herein, the shortest path stored in the storage unit 103 is referred to as a stored path tree.

If it is determined that the shortest path tree Se has already been calculated, from among all paths having, as respective end points, nodes whose shortest paths have not yet been calculated, a distance of a path going through the shortest path tree Se is measured (step S14). Herein, in reaching a node whose shortest path from the node 200-1 has not yet been calculated, like the node 200-3 or the node 200-4 in FIG. 13, a path which goes through the shortest path from the node 200-1 to the node 200-2 and the shortest path from the node 200-2 to each node is found. If the currently-found path has the shortest distance of all paths to respective nodes which have already been found, the currently-found path is taken as a tentative shortest path.

Figure 14:
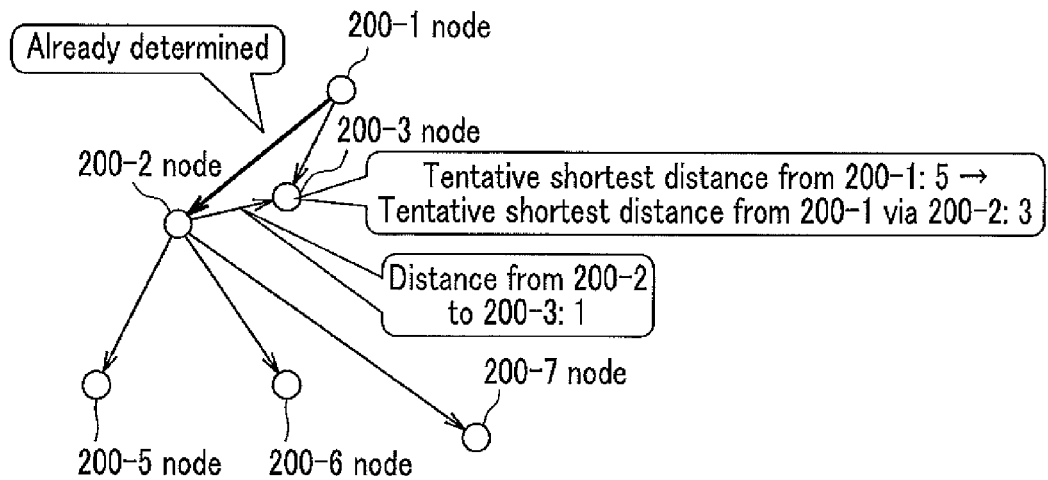
FIG. 14 is a schematic diagram illustrating procedures in a case where a shortest path tree Se which has already been calculated is present.

FIG. 14 is a schematic diagram illustrating procedures in a case where the shortest path tree Se which has already been calculated is present.

As shown in FIG. 14, for example, if a shortest path tree having the node 200-2 as the starting point is present, a distance from the node 200-2 to the node 200-3 is measured. In FIG. 14, for example, the distance from the node 200-2 to the node 200-3 is measured to obtain a value of "1".

The measured distance of the path is compared to a distance of the tentative shortest path going through any other path tree recorded in the node 200-3 (step S15).

If the measured distance is shorter than the distance of the tentative shortest path going through any other path tree recorded in the node 200-3, the path going through the shortest path tree Se is taken as the path to the node 200-3. The distance of the path to the node 200-3 is updated to the distance of the path going through the shortest path tree Se (step S16).

In FIG. 14, for example, the distance of the tentative shortest path via other path tree is "5". A distance of a path going through the shortest path tree Se via the node 200-2 is "2+1=3". This means that a distance of a path from the node 200-1 to the node 200-3 is shorter via the node 200-2 (2+1=3). Thus, the distance of the tentative shortest path is updated to "3" which is the distance of the path via the node 200-2.

In step S11, it is determined whether or not there is more candidate shortest path.

In step S13, in the meantime, if it is determined that the shortest path tree Se has not yet been calculated, an adjacent node of the selected node and a link to the adjacent node are searched for (step S17).

Next is compared a distance of a path going through an end node (in this case, the node 200-2) of a candidate path which has the searched node as an end point and is selected in step S12 (which may also be referred to as a searched distance), to a recorded value of a distance which is made to correspond to the searched node (that is, a distance of other path already having been found at the time of the search; which may also be referred to as a recorded distance) (step S18).

If the distance of the path via the selected node is shorter than the recorded distance, the path having the distance via the selected node is taken as a candidate shortest path to the searched node (step S19).

Figure 15:
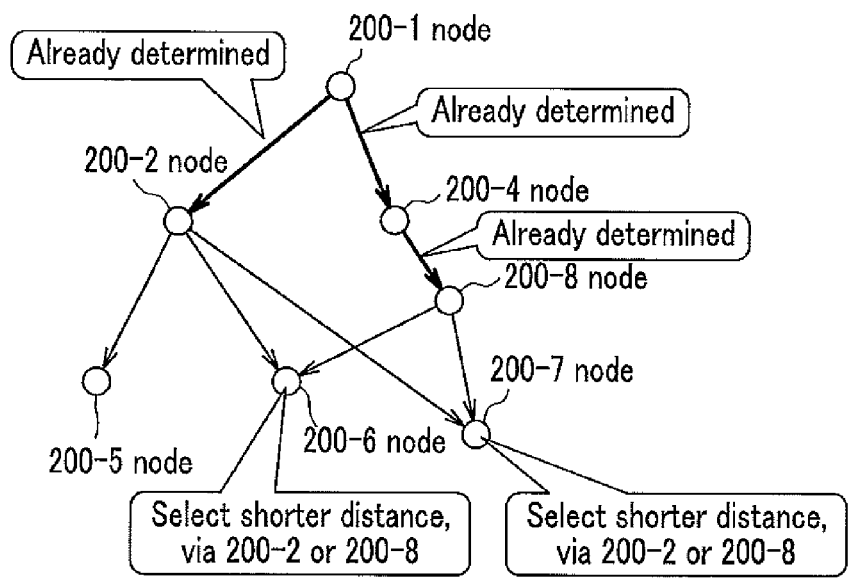
FIG. 15 is a diagram for explaining procedures in steps S17 to S19 of FIG. 11.

FIG. 15 is a diagram for explaining steps S17 to S19 shown in FIG. 11.

As shown in FIG. 15, after the shortest path to the node 200-8 is calculated, a path which goes through the shortest path from the node 200-1 to the node 200-8 and reaches a node adjacent to the node 200-8 by going through a one-hop link connecting the adjacent node is searched for. If a distance of the searched path is shorter than a distance of a tentative shortest path of the adjacent node, the searched path is taken as a candidate shortest path for the shortest path to the end point.

As described above, a path taken as a candidate shortest path is determined as a portion of the shortest path from the node 200-1.

The steps mentioned above are repeated until a candidate shortest path is not found any more.

Note that the above-described processing performed by the calculating apparatus 100 can be performed by a logic circuit manufactured in accordance with an intended purpose. The processing can also be performed in such a manner that: a program in which contents of the processing are described as a procedure is stored in a recording medium readable by the calculating apparatus 100; and the calculating apparatus 100 loads and executes the program stored in the recording medium. The recording medium readable by the calculating apparatus 100 refers to a removable recording medium such as a floppy disk (registered trademark), a magnetic optical disk, a DVD, and a CD, or a memory such as a ROM and a RAM or a HDD built into the calculating apparatus 100. The program stored in the recording medium is read by the control unit 102 in the calculating apparatus 100, and, under control of the control unit 102, a processing similar to the described above is performed. The control unit 102 herein operates as a computer for executing a program read from a recording medium in which the program is stored.

Advantageous Effects of Second Embodiment

In this embodiment as described above, in a network in which a plurality of nodes are connected by links, if a node or a link is added or removed, the shortest path which is the shortest communication path between two nodes of the plurality of nodes is calculated as follows. A distance of a first communication path between a starting node as a starting point of the communication path from the plurality of nodes and an adjacent node which is adjacent to the starting node is compared to a distance of a second communication path which has already been calculated other than the first communication path. If the distance of the first communication path is shorter than the distance of the second communication path, the first communication path is taken as the shortest path. On the other hand, if the distance of the first communication path is not shorter than the distance of the second communication path, the second communication path is taken as the shortest path. Such a comparison is subsequently performed taking, in turn, the adjacent node as a next starting node. This configuration makes it possible to suitably calculate the shortest path even if a topology changes because a link is newly added or removed.

In sum, by using this embodiment, the shortest path can be calculated even if a topology changes because a link is newly added or removed. Further, a time for calculating paths is reduced compared to the technique described in non-Patent Document 1, because, similarly to the technique described in non-Patent Document 2, the shortest path is calculated using path information which has already been calculated.

The invention claimed is:

1. A calculating apparatus which calculates the shortest path connecting two nodes in a network, comprising:
a storage unit that is configured to store therein information including information on a shortest path group which is a set of the shortest paths between the nodes, each of the shortest paths having the same node as a starting point;
a control unit that is configured to, based on a triggering event which is a topological change including addition of a link or deletion of a link:
calculate a shortest path group which is a set of shortest paths having a node Y as a starting point at once, by calculating the shortest path having the node Y as the starting point for each of nodes other than the node Y, and calculate a shortest path group of a first node which is any one of the nodes other than the node Y, using path information, the path information including a piece of information on a second node that is adjacent to the first node on a given path which goes through the first node and is located upstream of the first node in one hop and including multiple pieces of information on third nodes that are each adjacent to the first node on the given path which goes through the first node and are each located downstream of the first node in one hop; wherein paths between given nodes are represented in a tree structure by tracing an upstream or downstream relation between the first, second, and third nodes, and perform a first processing in which, in calculating the shortest path group having the node Y as the starting point, if the storage unit previously stores therein a shortest path group having a node X that is located upstream of the node Y in one hop, as a starting point, the shortest path group having the node X as the starting point having already been calculated after the topological change, the control unit takes, from among the shortest path group having the node X as the starting point, a path from the node Y to a node located downstream of the node Y as the shortest path of the shortest path group having the node Y as the starting point which is currently being calculated, that is, an intermediate calculation result of the shortest path group.

2. The calculating apparatus according to claim 1, wherein the control unit is further configured to:

perform a second processing in which the control unit searches for a node "a" from nodes not going through any portion of the intermediate calculation result of the shortest path group having the node Y as the starting point, the node "a" being reachable by a link in one hop from a node passing through a portion of the intermediate calculation result, and, from paths from the node Y to the node "a", the control unit takes a path R1 which goes through both the link in one hop and a path going through the intermediate calculation result from the node Y to a node going through a portion of the intermediate calculation result out of extreme points of the link, as a candidate shortest path from the node Y to the node "a", and perform a third processing in which, if the candidate shortest path from the node Y to the node "a" is present, the control unit selects a candidate shortest path having the shortest distance as R2, compares a distance of the selected shortest path R2 to an other path having been already found by the time of the selection of the shortest path R2 as a path from the node Y to the node "a", and, if the selected shortest path R2 is determined to be the shortest, takes the selected shortest path R2 as the shortest path from the node Y to the node "a" and also as a portion of an intermediate calculation result of the shortest path group having the node Y as the starting point.

3. The calculating apparatus according to claim 2, wherein, if a candidate shortest path having the node Y as the starting point and connecting any other node is present in the third processing, the control unit is further configured to select a candidate shortest path having the shortest distance as R2, compares a distance of the selected shortest path R2 to other path having been already found by the time of the selection of the shortest path R2 as a path from the node Y to the node "a", and, if the selected shortest path R2 is determined to be the shortest, takes the selected shortest path R2 as the shortest path from the node Y to the node "a" and also as a portion of an intermediate calculation result of the shortest path group having the node Y as the starting point.

4. The calculating apparatus according to claim 3, wherein the control unit is further configured to perform a fourth processing in which the control unit changes a distance from the node Y to a node located downstream of the node "a", to a distance which goes through both the selected shortest path from the node Y to the node a and a path reached in accordance with a path tree from the node a to the node located downstream of the node a, and takes the path tree located downstream of the node "a" as a portion of an intermediate calculation result of the shortest path group having the node Y as the starting point.

5. The calculating apparatus according to claim 4, wherein the control unit is further configured to:

perform a fifth processing in which the control unit searches for a node a' which is reachable by a link in one hop from a node located downstream of the node "a";

find, as a path from the node Y to the node a', a path R3 which reaches the node a' from the node Y in accordance with a path tree, and a path R4 which goes through the link in one hop, the selected shortest path from the node Y to the node "a", and a path from the node "a" to an extreme point of the link in one hop;

and, if a distance of the path R4 is shorter, take the path R4 as a candidate shortest path from the node Y to the node a', and wherein, returning back to the third processing, the control unit is further configured to determine the shortest path from the node Y to the node a'.

6. A path calculating method of calculating a shortest path connecting two nodes in a network, the method comprising:

a storing step of storing information including information on a shortest path group which is a set of the shortest paths between the nodes, each of the shortest paths having the same node as a starting point; and a controlling and calculating step, based on a triggering event which is a topological change including addition of a link or deletion of a link, of calculating a shortest path group which is a set of shortest paths having a node Y as a starting point at once, by calculating the shortest path having the node Y as the starting point for each of nodes other than the node Y, and calculating a shortest path group of a first node which is any one of the nodes other than the node Y, using path information, the path information including a piece of information on a second node that is adjacent to the first node on a given path which goes through the first node and is located upstream of the first node in one hop and including multiple pieces of information on third nodes that are each adjacent to the first node on the given path which goes through the first node and are each located downstream of the first node in one hop; wherein paths between given nodes are represented in a tree structure by tracing an upstream or downstream relation between the first, second, and third nodes, and wherein the calculation performed by the controlling and calculating step includes a first processing in which, in calculating the shortest path group having the node Y as the starting point, if a shortest path group having a node X that is located upstream of the node Y in one hop, as a starting point, is previously stored by the storing step, the shortest path group having the node X as the starting point having already been calculated after the topological change, in the controlling and calculating step, from among the shortest path group having the node X as the starting point, a path from the node Y to a node located downstream of the node Y is taken as the shortest path of the shortest path group having the node Y as the starting point which is currently being calculated, that is, an intermediate calculation result of the shortest path group.

7. The path calculating method according to claim 6,
wherein the calculation performed by the controlling and calculating step includes:
- a second processing in which: a node "a" is searched for from nodes not going through any portion of the intermediate calculation result of the shortest path group having the node Y as the starting point, the node "a" being reachable by a link in one hop from a node passing through a portion of the intermediate calculation result; and, from paths from the node Y to the node "a", a path R1 which goes through both the link in one hop and a path going through the intermediate calculation result from the node Y to a node going through a portion of the intermediate calculation result out of extreme points of the link is taken as a candidate shortest path from the node Y to the node "a"; and
- a third processing in which: if the candidate shortest path from the node Y to the node "a" is present, a candidate shortest path having the shortest distance is selected as R2; a distance of the selected shortest path R2 is compared to an other path having been already found by the time of the selection of the shortest path R2 as a path from the node Y to the node "a"; and, if the selected shortest path R2 is determined to be the shortest, takes the selected shortest path R2 as the shortest path from the node Y to the node "a" and also as a portion of an intermediate calculation result of the shortest path group having the node Y as the starting point.

8. The path calculating method according to claim 7,
wherein, in the calculation performed by the controlling and calculating step includes:
selecting a candidate shortest path having the shortest distance as R2 if a candidate shortest path having the node Y as the starting point and connecting any other node is present in the third processing;
comparing a distance of the selected shortest path R2 to an other path having been already found by the time of the selection of the shortest path R2 as a path from the node Y to the node "a"; and,
if the selected shortest path R2 is determined to be the shortest, taking the selected shortest path R2 as the shortest path from the node Y to the node "a" and also as a portion of an intermediate calculation result of the shortest path group having the node Y as the starting point.

9. The path calculating method according to claim 8,
wherein the calculation performed by the controlling and calculating step includes a fourth processing in which: a distance from the node Y to a node located downstream of the node "a" is changed to a distance which goes through both the selected shortest path from the node Y to the node "a" and a path reached in accordance with a path tree from the node "a" to the node located downstream of the node "a"; and the path tree located downstream of the node "a" is taken as a portion of an intermediate calculation result of the shortest path group having the node Y as the starting point.

10. The path calculating method according to claim 9,
wherein the calculation performed by the controlling and calculating step includes a fifth processing in which: a node a' which is reachable by a link in one hop from a node located downstream of the node "a" is searched for; a path R3 which reaches the node a' from the node Y in accordance with a path tree, and a path R4 which goes through the link in one hop, the selected shortest path from the node Y to the node "a", and a path from the node "a" to an extreme point of the link in one hop are found as a path from the node Y to the node a; and, if a distance of the path R4 is shorter, the path R4 is taken as a candidate shortest path from the node Y to the node a', and
wherein, returning back to the third processing determines the shortest path from the node Y to the node a'.

11. A system including a processor and a non-transitory computer readable medium storing instructions for causing the processor to perform the path calculating method according to claim 6.

12. A system including a processor and a non-transitory computer readable medium storing instructions for causing the processor to perform the path calculating method according to claim 7.

13. A system including a processor and a non-transitory computer readable medium storing instructions for causing the processor to perform the path calculating method according to claim 8.

14. A system including a processor and a non-transitory computer readable medium storing instructions for causing the processor to perform the path calculating method according to claim 9.

15. A system including a processor and a non-transitory computer readable medium storing instructions for causing the processor to perform the path calculating method according to claim 10.

* * * * *